Sheet 1-2 Sheets.
W. Wells;
Reciprocating Steam Engine,
No. 838, Reissued Oct. 18, 1859.
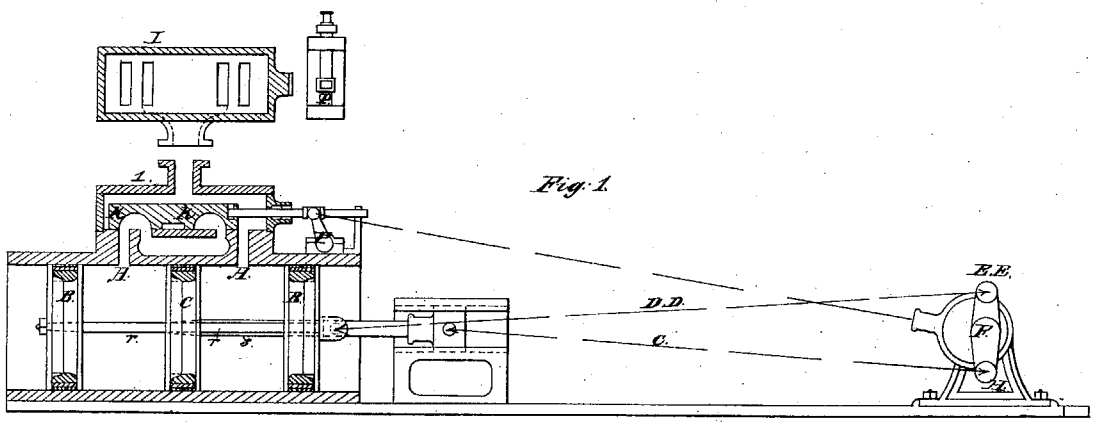
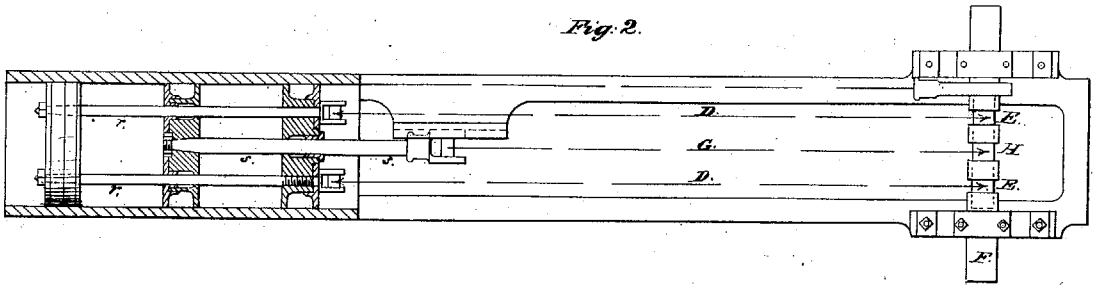
N. PETERS, PHOTO-LITHOGRAPHER, WASHINGTON, D. C.

Sheet 2-2 Sheets.
W. Wells,
Reciprocating Steam Engine,
No. 838, Reissued Oct. 18, 1859.
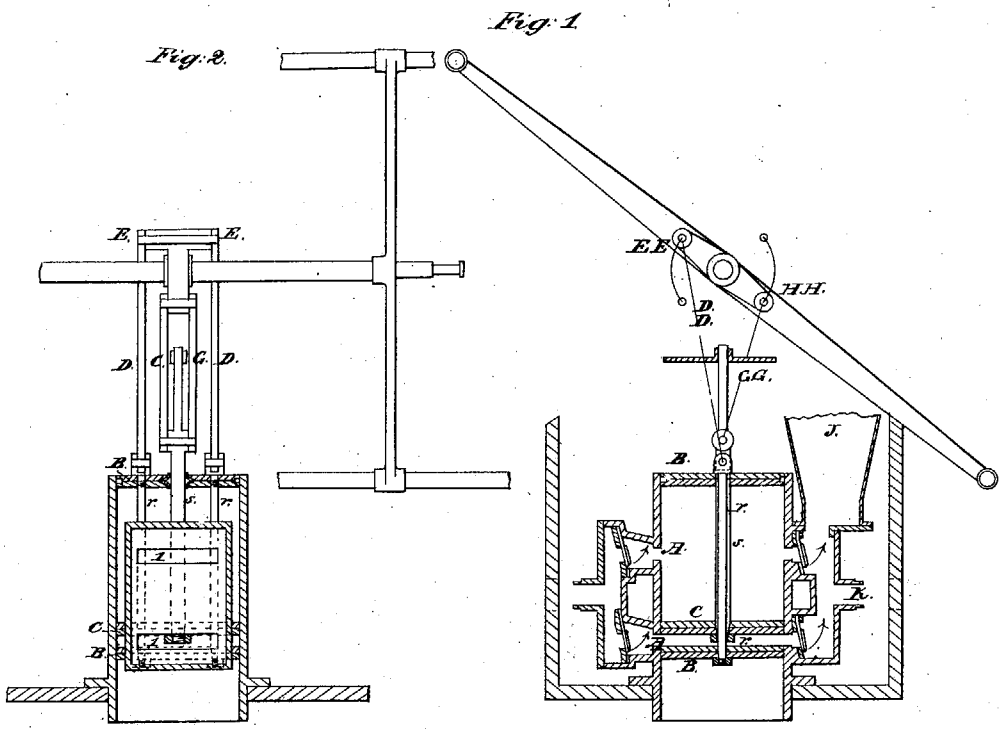
N. PETERS, PHOTO-LITHOGRAPHER, WASHINGTON, D. C.

UNITED STATES PATENT OFFICE.

WALLACE WELLS, OF NEW YORK, N. Y., ASSIGNOR TO HIMSELF AND SAMUEL B. WELLS.

IMPROVED CONSTRUCTION OF CYLINDERS AND PISTONS FOR PUMPS AND STEAM-ENGINES.

Specification forming part of Letters Patent No. 21,789, dated October 12, 1858; Reissue No. 838, dated October 18, 1859.

*To all whom it may concern:*

Be it known that I, WALLACE WELLS, of the city and county of New York, in the State of New York, have invented a new and useful improvement in the cylinders, pistons, connections, and cranks for steam-engines, and in the mode of applying steam thereto; also, in the cylinders and pistons and connections for fire-engines, pumps, bellows, and other machines using cylinders and pistons; and I hereby declare that the following is a full, clear, and exact description of the construction and operation of the same, reference being had to the annexed drawings, making a part of this specification.

Plate No. 1 represents the application of this invention to the steam-engine. Figure 1 is a lateral section of the cylinder, &c.

The cylinder is constructed in the usual form, except that no cylinder-heads are used, and the steam-ports A′ A″ are at points distant one-third the length of the cylinder from the ends. The cylinder is provided with three pistons—two outside or end pistons, B′ B″, and a middle piston, C. The two end pistons are connected permanently by two rods, *r′ r′*, which work through the middle piston opposite its center. The middle piston, C, has a rod, *s*, which works through the center of the outside piston at that end of the cylinder where the power is to be applied. The outside piston at the same end has two connecting-rods, D′ D″, of equal length, attached at points opposite its center, and connecting with two arms, E′ E″, on the same side of the crank and shaft F. The rod of the middle piston, at the end outside, has a connecting-rod, G, extending to and connecting with the opposite arm, H, of the crank, which arm is in the center, between the arms E′ E″, but on the opposite side. The steam-chest I and the valves K K are in the usual form.

The movement of the engine thus constructed is as follows: The steam, when admitted at the port on one side of the middle piston, acts equally on that side and on the end piston opposite thereto, forcing them apart to the proper point, where the steam is cut off, then being admitted at the other port reverses the motion. The movement of both pistons in opposite directions is thus communicated to the shaft in one and the same direction. The entire force of the steam is expended upon the movement itself, instead of being in part expended on the permanent cylinder-heads now used, and in overcoming friction at the journals of the shaft. The force of the steam both ways is direct, and not reflected. The power being applied to both sides of the shaft equally at the same time and in the same direction, an equilibrium of force and motion is established, by means of which I contemplate that the friction, jar, and strain of the engine will be greatly diminished, and consequently its operative power and speed much increased, especially in marine-engines. This mode of construction also dispenses with a great deal of the weight and strength now required in bed-plates, braces, and fastenings.

Fig. 2 is a superficial section of the cylinder.

Plate No. 2 represents the application of this invention in the construction of fire-engines, pumps, &c., Fig. 1 being a vertical section, and Fig. 2 a lateral section.

The cylinder is constructed without heads, and has three pistons, the two end pistons, B′ B″, being connected together by rods *r r*, working through the middle piston, C, at points opposite its center. The middle piston has a rod, *s*, working through the center of the upper piston. The latter has two connecting-rods of equal length, D′ D″, attached at points opposite its center, and connecting with one arm, E, of the lever. The upper end of the rod of the middle piston has a connecting-rod, G, connecting with the other arm, H, of the lever.

The cylinder has two ports, A′ A″, admitting the water, and two opposite, I′ I″, for discharging, to which are adjusted the necessary valves. J is the air-chamber, and the hose-connection is attached at K.

The action of the pump thus constructed is double or compound in receiving and discharging the water, resulting in a great increase in the force and regularity of the discharge. An important advantage is also gained in the increased power of the lever, as the connecting-rods D and G are attached much nearer the center of the shaft than is practicable in the engines now used, which require two cylinders, the centers of which are farther removed.

The invention which I claim as mine, and desire to secure by Letters Patent, is—

The combination of the cylinder open at both ends with three pistons and their connections, arranged substantially as herein set forth.

WALLACE WELLS.

Witnesses:
W. WELLS,
B. C. THAYER.